United States Patent [19]

Miller

[11] Patent Number: 5,074,199
[45] Date of Patent: Dec. 24, 1991

[54] DEEP FAT FRYER WITH UPWARDLY AND DOWNWARDLY MOVABLE CONVEYOR AND HEATING APPARATUS

[75] Inventor: Michael E. Miller, Bellevue, Ohio
[73] Assignee: Stein, Inc., Sandusky, Ohio
[21] Appl. No.: 410,974
[22] Filed: Sep. 22, 1989
[51] Int. Cl.$^5$ ............................................. A47J 37/12
[52] U.S. Cl. ........................................ 99/404; 99/407; 99/408
[58] Field of Search ................. 99/403, 404, 405, 406, 99/407, 408, 443 C, 337, 339, 330, 410; 426/511; 126/391

[56] References Cited

U.S. PATENT DOCUMENTS

| | | | |
|---|---|---|---|
| 1,760,979 | 6/1930 | Ferry | 99/405 |
| 2,546,163 | 3/1951 | McBeth | 99/404 |
| 2,833,203 | 5/1958 | Benson et al. | 99/404 |
| 3,309,981 | 3/1967 | Benson et al. | 99/407 |
| 3,376,806 | 4/1968 | Magnusson | 99/408 |
| 3,635,149 | 1/1972 | Smith et al. | 99/407 |
| 3,757,672 | 9/1973 | Szabrak et al. | 99/404 |
| 4,187,771 | 2/1980 | Westover et al. | 99/443 C |
| 4,561,347 | 12/1985 | Zaitu | 426/511 |
| 4,584,931 | 4/1986 | Feehan | 99/353 |
| 4,628,804 | 12/1986 | Belshaw et al. | 99/409 |
| 4,852,475 | 8/1989 | Yang | 99/404 |

Primary Examiner—Timothy F. Simone
Attorney, Agent, or Firm—Baldwin, Egan & Fetzer

[57] ABSTRACT

A deep fat fryer having an elongated housing for holding a bath of hot fat through which an endless main conveyor carries a food product through the bath from the infeed end to a discharge end of the housing. Above the main conveyor is a submerger conveyor having a run moving from the infeed end to the discharge end of the housing and adapted in operative position to line close to the food portions on the main conveyor and hold them submerged in the hot fat bath. In operative cooking position of the conveyor apparatus, the submerger conveyor nests into the side rails of the main conveyor and an elongated hood encloses the hot bath housing at a zone above the submerger covneyor from one end of the housing to the other. For clearing occasional food product blockage from the conveyor means during operation or for cleaning and maintenance, power means is provided to lift the hood, the submerger conveyor and the main conveyor out of the hot bath and to move then to an inoperative position of separated horizontal levels so as to provide access space between the hood and the submerger conveyor, and between the two conveyors, and between the main conveyor and the housing holding the hot bath.

11 Claims, 3 Drawing Sheets

DEEP FAT FRYER WITH UPWARDLY AND DOWNWARDLY MOVABLE CONVEYOR AND HEATING APPARATUS

BACKGROUND OF THE INVENTION

U.S. Pat. No. 3,757,672 dated Sept. 11, 1973 in the names of Robert H. Szabrak and Warren Stubblebine and entitled Deep Fat Fryer Feeding Apparatus, discloses a deep fat fryer of the general type with which the present invention is especially adpated for use although it will be understood that the present invention can also be effectively utilized with other fryer arrangements. The heating unit for heating the hot fat bath in the fryer of the aforementioned patent is of the direct fired type comprising jet burner tubes which direct hot burning gas into heating tubes (FIG. 4 of the patent) running through the bath, for heating the bath to selected temperature.

It is also known in the deep fat fryer prior art to utilize heating units of the indirect heating type which are radiator-type units submerged in the deep fat bath of the fryer and embodying a plurality of tubing loops which carry hot, pressurized, circulating heating liquid or fluid therethrough which may be heated at a source remote from the fryer, for raising the heater units to a predetermined temperature and thus heating the deep fat bath of the fryer to the selected temperature for cooking the food products passed therethrough by the conveyor mechanism of the fryer.

The conveyor mechanism on the fryer comprises the parts thereof which require the most maintenance and repair, although the heating units likewise sometimes require repair, and if the heating units are raised above the bath while at their usual temperature of 500°–600° F., the hot fat bath is very likely to burst into flame, resulting in a fire in the fryer. Accordingly, in the past, it has generally been necessary to permit the heating units to cool down to a predetermined lower temperature before attempting to raise them out of the fryer bath, in order to prevent the likelihood of starting the bath on fire.

SUMMARY OF THE INVENTION

The present invention provides a deep fat fryer in which the indirectly fired heater units thereof are selectively coupleable with the conveyor mechanism so that such heater units when at a relatively cool temperature can be raised up out of the fryer bath, if such is deemed necessary, in order to repair or clean the heating units, but wherein alternatively, the heating units when at a relatively high temperature can be selectively maintained in non-coupled relation to the conveyor mechanism, so that the latter can be raised out of the bath to clear occasional food product blockage on the conveyor or for maintenance or repair while the heating units remain in the bath, thus eliminating the probability or possibility of a fire in the bath of the fryer, and without the necessity of waiting for the heating units to cool down.

Accordingly, an object of the present invention is to provide an elongated deep fat fryer which is easy and economical to operate and to maintain.

Another object of the invention is to provide an apparatus for deep fat frying of food product, and which includes a housing for encompassing a hot cooking bath, with an endless conveyor mounted on the housing for carrying when in operative position, food product through the bath for cooking of the food product, and with means for lifting the conveyor upwardly to an inoperative position above the bath for clearing occasional food product blockage from the conveyor or for maintenance and/or repair of the conveyor, and with heater means selectively coupleable to the conveyor whereby the heater means when at a relatively cool temperature is movable upwardly with the conveyor movement, out of the bath and then is movable back to operable position within the bath upon movement of said conveyor back to said operative position, or alternatively the heater means when at a relatively high temperature can be permitted to remain in operative position in the bath while the conveyor is moved upwardly to said inoperative position to clear occasional food product blockage from the same.

A still further object is to provide a fryer of the latter described type wherein the heater means comprises radiator-type heater members composed of heating loops having an inlet end and an outlet end for circulation of hot heating fluid therethrough, with a plurality of said heater members being arranged in tandem, each having a hot side and a relatively cooler side in use, with said hot and said relatively cooler sides being alternated in a direction lengthwise of said housing to aid in equalizing heat distribution in said bath, across the width thereof.

Other objects and advantages of the invention will be apparent from the following description taken in conjunction with the accompanying drawings, wherein:

BRIEF DESCRIPTION OF THE DRAWINGS

in FIG. 4, the conveyor apparatus and heater units are illustrated in lowered operative positions within the bath of hot fat or oil.

DESCRIPTION OF PREFERRED EMBODIMENT

Figure 1:
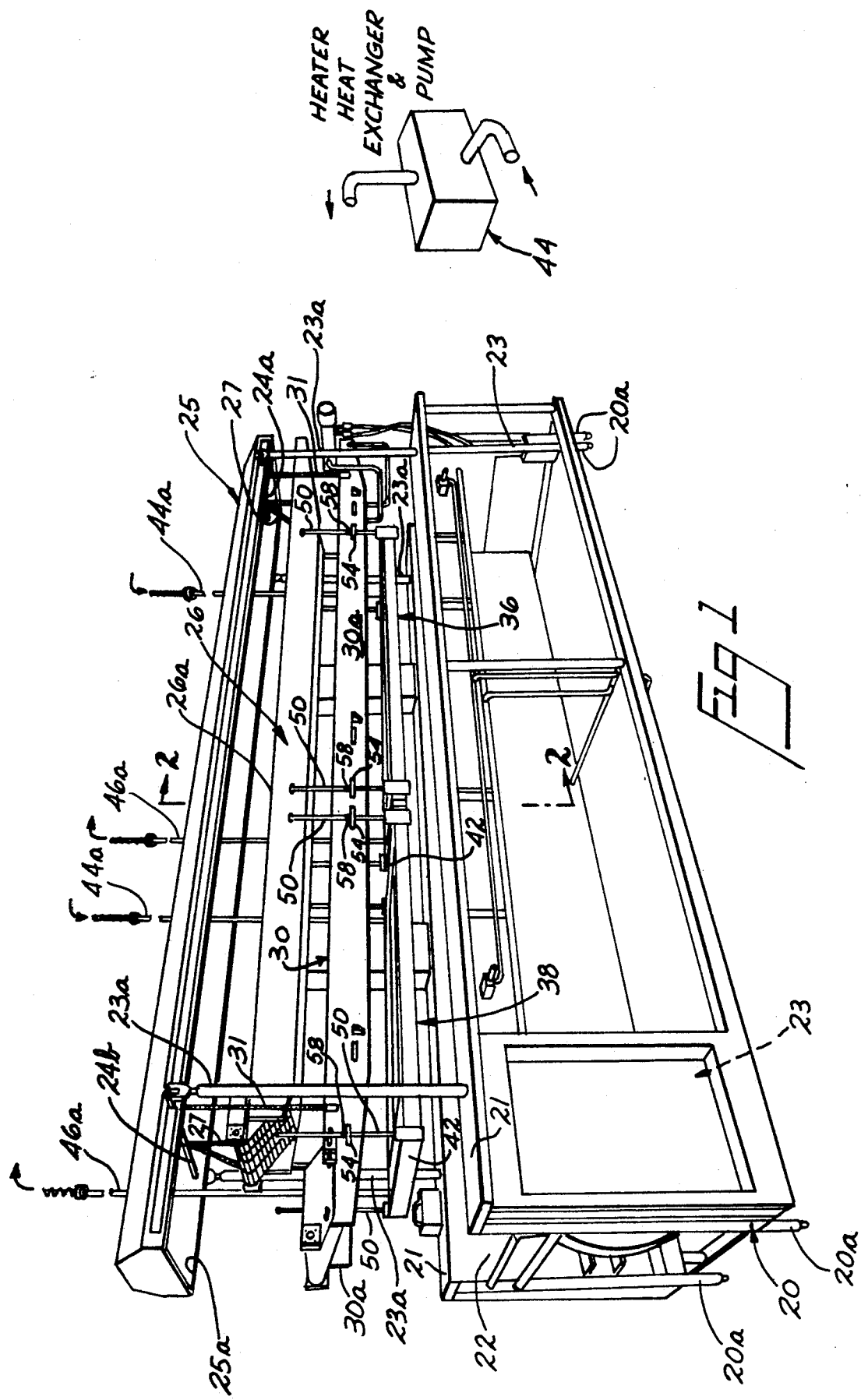
FIG. 1 is a perspective view of a fryer apparatus embodying this invention, looking at the rear of the apparatus from the discharge end thereof.

The apparatus as shown generally in FIG. 1 comprises a rigid unitary frame or housing 20 which extends from end to end of the apparatus and up to the level of apron members 21 which are directly secured to the top of the frame 20 and are connected in a unitary manner with a lining which forms an elongated horizontal reservoir 22 which extends from end to end of the apparatus for the purpose of holding a bath of hot fat or oil. The frame may have feet 20a which rest upon the floor.

Mounted near the four corners of the fryer apparatus are four generally vertically oriented preferably hydraulic, jacks 23, which have vertically extending piston rods 23a which are connected at their upper ends to a respective cross bar 24a near the infeed end of the apparatus and to a cross bar 24b near the discharge end of the fryer. Mounted above these cross bars is an elongated hood or cover 25 which has a rectangular opening 25a at its lower side which makes a generally close fit with the aprons 21 when the apparatus is in its nested and closed position for cooking operation as illustrated in FIG. 2.

Two parallel outer side rails 26a of a submerger conveyor 26 are suspended in the embodiment illustrated by shorter flexible chains 27 and at one end are connected to cross bar 24a and at the other end connected to cross bar 24b. a pair of parallel side rails 30a for the main conveyor 30 are suspended on longer flexible chains 31, two connected with cross bar 24a near the infeed end and two connected with cross bar 24b near the discharge end of the fryer. Reference may be had to aforementioned U.S. Pat. No. 3,757,672 for a more detailed discussion of the fryer construction and its operation. U.S. Pat. No. 3,757,672 is incorporated herein by reference. FIG. 1 shows the side rails 30a of the main conveyor 30 well above the hot bath in the housing 20, and with side rails 26a of the submerger conveyor 26 spaced vertically over the main conveyor, and finally with the hood 25 raised above the submerger conveyor rails 26a. In this open position of the parts, clearing of food product blockage from the conveyor or inspection, cleaning and maintenance is greatly facilitated.

Figure 2:
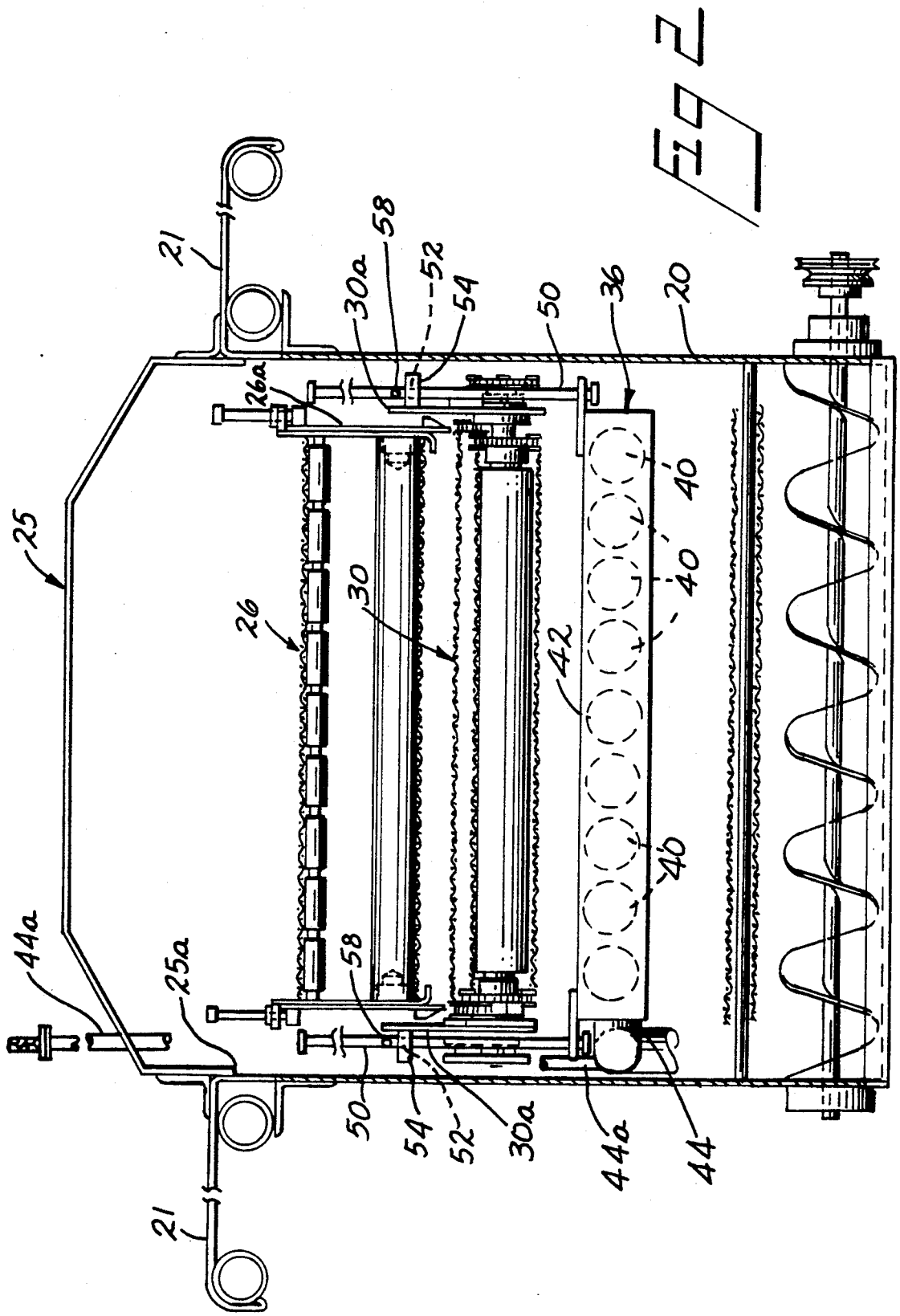
FIG. 2 is an enlarged, partially broken, sectional view taken generally along the plane of line 2—2 of FIG. 1, but wherein the hood, conveyor apparatus and heater units of the fryer have been lowered back down from the inoperative positions thereof shown in FIG. 1.
Figure 3:
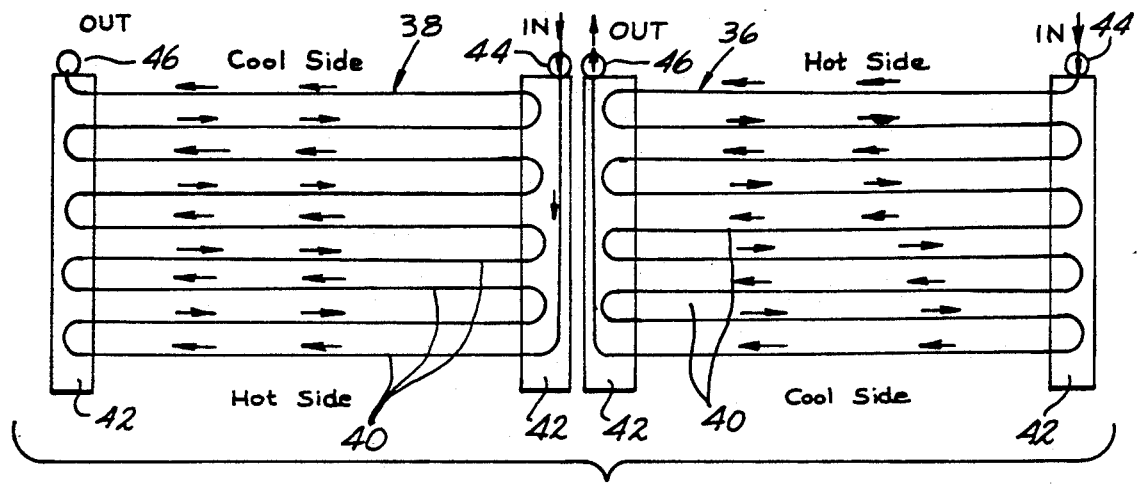
FIG. 3 is a diagrammatic top plan view of several radiator-type heater units of the type utilized in the fryer of FIGS. 1 and 2, showing the heater units in tandem relation and in use having a hot side and a relatively cooler side, with said hot and relatively cooler sides being alternated in a direction lengthwise of the fryer housing to aid in equalizing heat distribution in the hot fat bath across the width thereof.

Referring now in particular to FIGS. 2 and 3, the fryer embodies at least one pair of indirect fired or radiator-type heater units 36, 38, extending in tandem fashion lengthwise of the housing 20 and adapted for heating the bath of fat or oil to desired temperature (e.g. 400°-500° F.).

Figure 4:
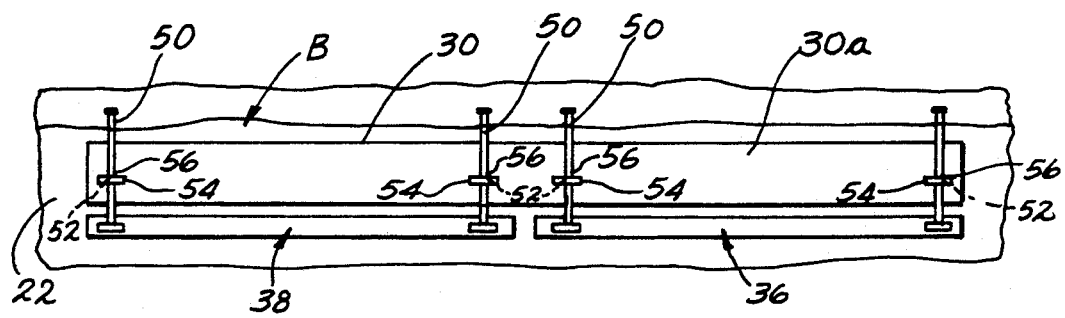
FIG. 4 is a diagrammatic, side elevational view of the heater units of the fryer of FIGS. 1 and 2, illustrating the coupling means coacting between the heater units and the overlying conveyor apparatus of the fryer, for selectively coupling the heater units to the conveyor apparatus in the upward direction of movement of the conveyor apparatus relative to the fryer housing.
Figure 5:
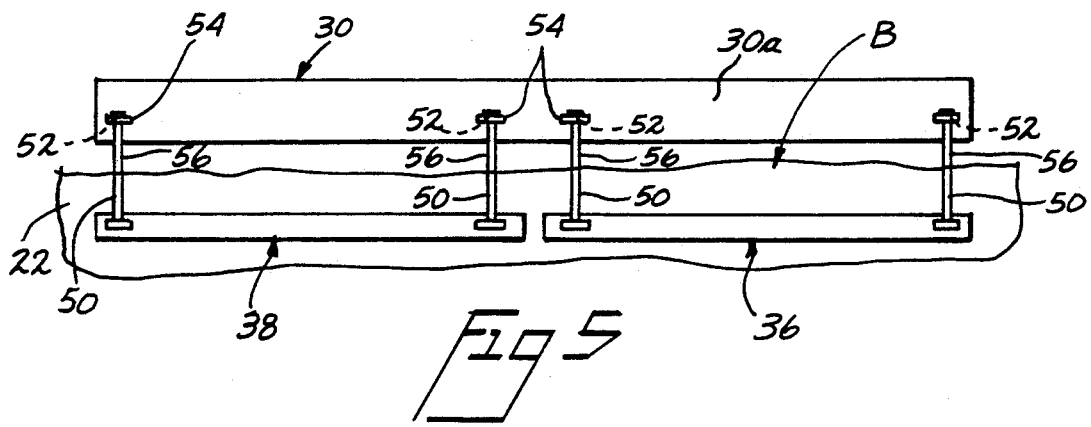
FIG. 5 is a diagrammatic, side elevational view generally similar to FIG. 4 except that the conveyor apparatus has been raised up out of the bath to an elevated inoperative position, such as that also illustrated in FIG. 1, but wherein the heater units remain in lowered condition in the bath, thus enabling clearing of occasional food product blockage from the conveyor or maintenance work to be performed on the conveyor apparatus, without the necessity of raising the hot heater units out of the bath; it will be understood that in aforementioned FIG. 1, the heater units are illustrated as being elevated with the conveyor apparatus out of the bath.

Each heater unit 36, 38 in the embodiment illustrated, comprises a plurality of coils 40 formed of tubing (e.g. metal tubing) extending between associated end members 42. The coils carry heated cooking fluid or liquid (e.g. oil) which has been heated at heat exchanger and pump mechanism 44, with such heated liquid being pumped under predetermined pressure through the coils 40 of the heater units 36, 38 for heating the latter, and thus transmitting such heat to the fryer bath B, when the heater units are submerged in the bath B, as shown for instance in FIGS. 2 and 4.

In this connection, it will be seen that each heater unit, in use, comprises a hot side and a relatively cooler side (FIG. 3) with such hot side and relatively cooler side of the heater units being alternated in a direction lengthwise of the fryer reservoir 22, to aid in equalizing heat distribution in the bath B, across the width of the bath, thus helping to obtain uniform results in the cooking or deep frying of food product.

As can be best seen in FIG. 1, the inlets and outlets 44, 46 of the heater units 36, 38 are coupled to piping 44a, 46a which extends up from the housing and through the hood 25 in relatively movable but preferably sealed relation therewith, with such piping being then coupled to respectively the inlet and outlet of aforementioned heat exchanger and pump apparatus 44.

As shown in FIGS. 1, 2, 4 and 5, heater units 36, 38 are movably coupled to conveyor apparatus 30 by, in the embodiment illustrated, generally vertically extending rods 50 which extend upwardly from the respective heater unit, and through openings 52 in a respective bracket 54 projecting laterally of side rails 30a of conveyor apparatus 30.

Each rod has an opening 56 therethrough which is adapted to receive a removable pin 58 (FIG. 2) for selectively locking the heater units to the conveyor apparatus in the upward direction of movement of the latter from the operative position shown in FIG. 2 of the conveyor apparatus, to the inoperative position illustrated in FIG. 1, wherein the hood 25, the conveyors 26, 30, and the heater units 36, 38, coupled to the conveyor 30, have been moved upwardly relative to the housing 20 by the extension or actuation of piston rods 23a of the hydraulic jacks of the fryer. In such upwardly raised condition of the parts, the latter can be inspected, cleaned and maintained.

Referring now again to FIG. 5, when it is desired to maintain the heater units 36, 38 submerged in the bath B while elevating the conveyor apparatus 26, 30 out of the bath, the pins 58 are not utilized or inserted into the respective opening 56 in each rod, and therefore when the conveyor structure 26 and 30 move upwardly out of the bath from for instance the FIG. 2 position to for instance the FIG. 1 position, responsive to actuation of jacks 23, the brackets 54 on the main conveyor rails 30a move vertically upwardly relative to rods 50, and above openings 56 in the rods, thus positioning the conveyor apparatus out of the bath B, while leaving the heater units 36, 38 in the bath.

From the foregoing discussion and accompanying drawings, it will be seen that the present invention provides a novel fryer mechanism which is easy and economical to operate, clean, and maintain, and a fryer in which indirect heated heater units are selectively coupleable to an overlying conveyor apparatus in a manner whereby the heater units can be raised above the fryer bath with the conveyor apparatus, or alternatively the heater units can be permitted to remain within the bath when the conveyor apparatus is moved up out of the bath for cleaning and/or repair.

The invention also provides a fryer mechanism embodying indirect fired heater units disposed in tandem relation lengthwise of the fryer housing, with each unit having a hot side and a relatively cooler side, with said hot and said relatively cooler sides being alternated in a direction lengthwise of the housing, to aid in equalizing heat distribution in the bath across the width of the housing.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a deep fat fryer, a housing adapted to hold a bath of hot fat or the like, endless conveyor means mounted on said housing and adapted in operative position to carry product portions on the upper run thereof from an infeed end of said housing to a discharge end thereof, including passing of the product portions through the bath, means for driving said conveyor means, power means coacting with said housing for lifting said conveyor means upwardly to an inoperative position above the bath, and for lowering said conveyor means downwardly to said operative position, heater means adapted to be positioned relative to said housing in the bath for heating the latter, and means coacting between said conveyor means and said heater means when said heater means is at a relatively cool temperature for selectively coupling said heater means to said conveyor means for moving the heater means upwardly with said conveyor means upon movement of the latter to said inoperative position whereby said heater means will be disposed above the bath, or alternatively to permit said heater means to remain in the bath when said heater means is at a relatively high temperature when said conveyor means is moved to said inoperative position above said bath.

2. A fryer in accordance with claim 1 wherein said heater means comprises radiator type heating means adapted for submergence in the bath, and including means for circulating heated fluid through said heater means for accomplishing heating of the bath.

3. A fryer in accordance with claim 2 wherein said heater means comprises a member having heating loops with an inlet end and an outlet end for circulation of heated fluid through said loops, and wherein a plurality of said members are utilized in generally tandem arrangement relative to said housing to, in use, aid in equalizing heat distribution in the bath, across the width of said housing.

4. A fryer in accordance with claim 1 wherein said means coacting between said conveyor means and said heater means comprises generally upstanding rods on said heater means extending through respective openings in laterally projecting bracket means on said conveyor means, together with means for selectively locking said rods to said bracket means in the upward direction of movement of said conveyor means relative to said housing.

5. A fryer in accordance with claim 4 wherein said selectively locking means comprises an opening in the respective of each of said rods, disposed above the respective of said bracket means in said operative position of said conveyor means, each said opening adapted to receive a respective removable pin for said selective locking of said rods to said bracket means in said upward direction of movement of said conveyor means relative to said housing, and when said pin is removed from the respective said opening, permitting said heater means to remain submerged in the bath during said upward direction of movement of said conveyor means to said inoperative position.

6. A fryer in accordance with claim 2 wherein said heater means comprises a member having heating loops with an inlet end and an outlet end for circulation of heated fluid through said loops, said member in use having a hot side and a relatively cooler side, and wherein a plurality of said members are utilized in generally tandem arrangement relative to said housing, said hot and said relatively cooler sides of said member in use being alternated in a direction lengthwise of said housing to aid in equalizing heat distribution in the bath, across the width of said housing.

7. A fryer in accordance with claim 1 wherein said conveyor means comprises an endless main conveyor adapted to carry product portions on the upper run thereof through the bath, and a submerger conveyor having a run moving from said infeed end to said discharge end and adapted in operative position to be close to said main conveyor and hold product portions submerged in the bath.

8. A fryer in accordance with claim 1 including a hood for said housing adapted to cover the latter from end to end, and said power means coacting with said hood for lifting said hood to a position spaced above said housing when said conveyor mean is in said inoperative position.

9. A fryer in accordance with claim 8 wherein said power means comprises a plurality of hydraulic jacks having piston rods connected to said hood, and a source of pressurized hydraulic fluid connected to said jacks.

10. A fryer in accordance with claim 7 wherein said main conveyor includes a pair of spaced generally parallel side rails, said means coacting between said conveyor means and said heater means comprising generally vertically extending members secured to said heater means and extending upwardly therefrom and bracket means on said side rails through which said members extend in relatively vertical movable relation, and means coacting between said members and said bracket means for selectively locking said members to said bracket means in the upward direction of movement of said conveyor means relative to said housing whereby said heater means will be lifted upwardly relative to said housing with said conveyor means during movement of said conveyor means to said inoperative position.

11. A fryer in accordance with claim 2 wherein said circulating means comprises a heat exchanger including a source of heat and a powered pump.

* * * * *